United States Patent
Tomlinson

(10) Patent No.: US 7,099,478 B2
(45) Date of Patent: Aug. 29, 2006

(54) APPARATUS FOR AND METHOD OF CONTROLLING PROPAGATION OF DECRYPTION KEYS

(75) Inventor: David Robin Tomlinson, Taunton (GB)

(73) Assignee: Data Encryption Systems Limited, (GB)

( * ) Notice: Subject to any disclaimer, the term of this patent is extended or adjusted under 35 U.S.C. 154(b) by 885 days.

(21) Appl. No.: 10/085,163

(22) Filed: Feb. 27, 2002

(65) Prior Publication Data

US 2003/0044018 A1 Mar. 6, 2003

(30) Foreign Application Priority Data

Sep. 5, 2001 (GB) ................... 0121502.9

(51) Int. Cl.
*H04L 9/08* (2006.01)
(52) U.S. Cl. ................. 380/280; 380/284; 713/193
(58) Field of Classification Search ............ 380/280, 380/283, 279, 284; 713/193
See application file for complete search history.

(56) References Cited

U.S. PATENT DOCUMENTS

| | | | |
|---|---|---|---|
| 5,534,857 A | * 7/1996 | Laing et al. ............ 340/5.74 |
| 5,825,876 A | * 10/1998 | Peterson, Jr. ............ 705/52 |
| 6,246,771 B1 | * 6/2001 | Stanton et al. ............ 380/286 |
| 6,847,719 B1 | * 1/2005 | Ballard .................... 380/279 |

FOREIGN PATENT DOCUMENTS

| | | |
|---|---|---|
| RU | 2040117 | 7/1995 |
| RU | 1306360 | 12/1995 |
| RU | 2145437 | 2/2000 |
| WO | WO 01/41353 A2 | 6/2001 |
| WO | WO 01/52017 A1 | 7/2001 |

OTHER PUBLICATIONS

English version of Russian Examination Report No. 2004107577/09.

* cited by examiner

*Primary Examiner*—Jacques H. Louis-Jacques
*Assistant Examiner*—Andrew L. Nalven
(74) *Attorney, Agent, or Firm*—Baker & McKenzie LLP

(57) ABSTRACT

An apparatus for and method of controlling propagation of decryption keys is provided. One embodiment of the present invention includes an encryption key propagation control system wherein a generation number is identified with each decryption key and the generation number is queried each time a request is made to forward the decryption key to another user. The generation number is decremented at each request, and once it reaches zero, further requests are refused by the control system.

32 Claims, 4 Drawing Sheets

APPARATUS FOR AND METHOD OF CONTROLLING PROPAGATION OF DECRYPTION KEYS

PRIORITY CLAIM AND CROSS REFERENCE TO RELATED APPLICATION(S)

This application claims priority to United Kingdom Patent Application No. 0121502.9 that has a filing date of sep. 5, 2001 and is incorporated by reference into this application.

FIELD OF THE INVENTION

The present invention generally relates to encryption. More particularly, the invention concerns an apparatus for and a method of controlling propagation of decryption keys or access to encrypted information.

BACKGROUND OF THE INVENTION

There is often a need to control access to data. In some computing environments this goal has been achieved by virtue of limiting the physical access to a machine, to a data carrier, or to parts of a local area network. However such systems can be unnecessarily rigid and cumbersome, especially when the class of persons to whom access may be allowed or denied to a particular item of data is ill defined.

Another approach to security is the use of encryption. In a secure system, the identity of each person who should have access to a document or other item of encrypted data needs to be defined at the time of encryption. This can, once again, be difficult where the class of people who should receive the data is ill defined.

Neither of these themes works particularly well in a "generally trusted" environment where absolute security is not necessary. An example of a generally trusted environment is a company where a manager may be dealing with a commercially sensitive document, and may wish to share this with other managers and in turn recognizes that they may need to share the document with other individuals where they deem this to be necessary or desirable. Thus the document cannot be "open" such that everyone can view it, as it may be commercially sensitive, but neither can the recipient list be accurately defined right from the outset.

Therefore, there exists a need for an apparatus and method of controlling access to encrypted information.

SUMMARY OF THE INVENTION

According to one embodiment of the present invention, there is provided a security system for controlling access to encrypted information, the security system comprising a hardware device for storing a decryption key for use in decrypting an encrypted item of information, the decryption key being associated with the security code which is used by the hardware device to determine whether it is authorized to send encrypted copies of the decryption key to others.

It is thus possible to give the originator of an item of information control over the number of times that that item of information may be passed from one person to another or how many times the decryption key can be passed from one person to another, under circumstances where the item of information is in an encrypted form.

According to a another embodiment of the present invention, there is provided a method of controlling access to of encrypted data, the method comprising encrypting the data with an encryption key, and making copies of the decryption key available to selected persons, the decryption keys being associated with a propagation control word, and wherein in response to an instruction to send the decryption key to a specified recipient, the propagation control word is checked to determine whether the propagation of the decryption key is allowed, and if so the control word is modified and then the decryption key and the control word are encrypted with the recipient's public key and sent to the recipient.

It is thus possible to provide a security system that allows limited propagation of an encrypted document or access thereto, even in an environment where the group of recipients requiring access to that document is not well defined.

These and other features and advantages of the present invention will be appreciated from review of the following detailed description of the invention, along with the accompanying figures in which like reference numerals refer to like parts throughout.

Figure 1:
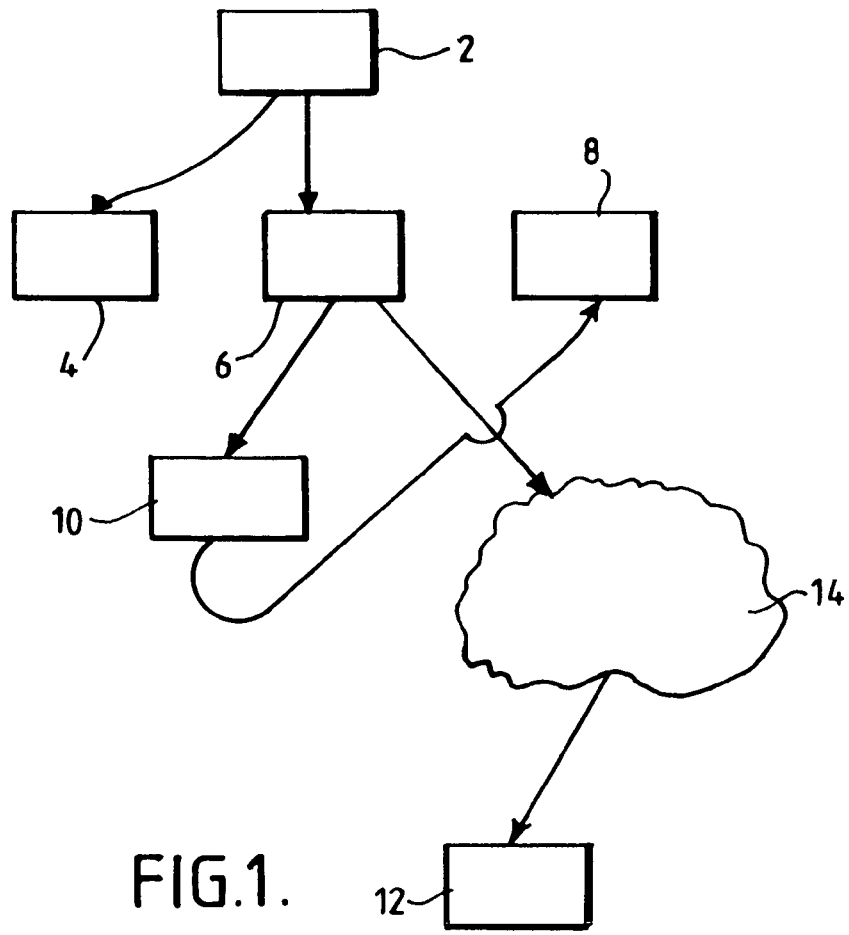
FIG. 1 schematically illustrates a possible propagation path for a sensitive document within a multi-user environment.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, "the present invention" refers to any one of the embodiments of the invention, or equivalents thereof, described herein.

According to one embodiment of the present invention, there is provided a security system for controlling access to encrypted information, the security system comprising a hardware device for storing a decryption key for use in decrypting an encrypted item of information, the decryption key being associated with the security code which is used by the hardware device to determine whether it is authorized to send encrypted copies of the decryption key to others.

It is thus possible to give the originator of an item of information control over the number of times that that item of information may be passed from one person to another or how many times the decryption key can be passed from one person to another, under circumstances where the item of information is in an encrypted form.

Preferably the decryption key is related to a specific project or task. Thus the controller or originator of a task can generate a key that can be used for encryption and decryption of documents within that project or task.

One feature of the present invention is that the decryption key may also include a further identifier that is unique to an entity, such as a company, so that only people having a corresponding code portion in their security device can decrypt the key for the documents.

Preferably, when a further person wishes to receive a copy of the encrypted information, the decryption key for the encrypted information is sent to that other user in an encrypted form. Advantageously the encryption key is itself encrypted with the recipient's public encryption key.

Another feature of the present invention is that the hardware device may further modify the security code each time it sends the decryption key to another user. It is thus possible to keep a track on the number of times the decryption key is propagated from one person to another. This security code may, for example, be a "generation limit" set by the originator of the document, and each time the decryption key is propagated, the generation limit is decremented. Once the generation limit reaches zero, further propagation of the decryption key is inhibited by the hardware device.

Another feature of the present invention is that the decryption key may be further associated with a security device and/or user identity number which is unique. Each time the decryption key is propagated, the identity of the user or security device that authorized the propagation of the decryption key may be added to the decryption key. It is thus possible for an audit trail to be identified that shows the path through which a decryption key has passed. The identity may overwrite a previous identity or be appended to a list of identities. The list may be stored in the security device or elsewhere, such as a log file in a user's computer.

Thus, when propagating a decryption key to a further user, the person authorizing the propagation may have the ability to modify the generation limit, so as to decrement it. A person authorizing the propagation of the key, or the originator, may also be able to set one or more control words or control flags such that the security device is instructed to send a message to that person when an attempt to further propagate the key is initiated. Indeed, the further propagation of the decryption key may be inhibited until such time as that person sends a return message to the security device authorizing the further propagation of key. Thus it is possible to set the security system such that it automatically generates an audit trail and/or such that it seeks further authority from a manager when sending further copies of the decryption key, which copies still represent "generations" of the key which are within the limit authorized by the "generation limit".

The authority to send the key may be generated automatically by an agent on a server that keeps a control log of propagations.

The security device may interface with a further device permanently embedded within the computer, or software loaded or embedded within the computer such that attempts to access a secure document without the proper decryption key results in a message being sent back to a system administrator, or the author of the document, or some other person defined by a suitable security field included within the document or included within a security file associated with the document. The file associated with the document may itself be encrypted.

Another feature of the present invention is that the security device may, for example, be in the form of a small unit which the user can carry with them and which is dockable and undockable with a data processor, for example a standard PC, portable computing device and so on having a suitable socket. Thus, the security device effectively functions as a dongle, but is not to be confused with the old style dongles which were hardware devices permanently connected to the printer port of a computer. Wireless communication is also possible.

In one embodiment of the present invention the security device may be password protected. The security device can therefore be set to disable after a number of incorrect entries of the password.

According to a second aspect of the present invention, there is provided a method of controlling access to of encrypted data, the method comprising encrypting the data with an encryption key, and making copies of the decryption key available to selected persons, the decryption keys being associated with a propagation control word, and wherein in response to an instruction to send the decryption key to a specified recipient, the propagation control word is checked to determine whether the propagation of the decryption key is allowed, and if so the control word is modified and then the decryption key and the control word are encrypted with the recipient's public key and sent to the recipient.

Thus, the control word is set by an originator of the encrypted data and the control word is decremented at each propagation, with further propagation of the decryption key being inhibited once the control word reaches a predetermined value. The predetermined value may, for example, be zero.

Preferably each recipient of the key has the ability to modify the control word such that the number of further propagations can be reduced, but not increased.

Encryption and decryption keys can belong to individuals, or can belong to groups of people such that data can be shared amongst those people working, for example, on a particular project.

The hardware component of the system preferably includes a data processor such that encryption and decryption of the decryption key is performed solely within the hardware unit. Additionally the hardware unit may further comprise a non-volatile memory such that the association between an encrypted document or other entity or service and the appropriate decryption key is maintained solely within the hardware unit.

It is thus possible to provide a security system which allows limited propagation of an encrypted document or access thereto, even in an environment where the group of recipients requiring access to that document is not well defined.

FIG. 1 illustrates the arrangement where an originator 2 of a document wishes or needs to share this document with his co-workers 4 and 6. However, for whatever reason, the originator 2 may desire that the document does not reach his colleague 8. However, since workers 4 and 6 have had access to the document, they may then deal with it as they see fit, and worker 6 may for example forward the document on to a further colleague 10 who unaware of the wishes of the originator 2 may then forward the document on to the worker 8. The worker 6 may also e-mail the document to another person 12 via an external telecommunications network 14. Thus the contents of the document have now escaped from the control of the originator and the document may circulate amongst other people outside of the company.

A traditional way to address this problem would be to encrypt the document at the time of transmission to workers 4 and 6. Depending on the security features of the encryption system used, the originator 2 may be able to inhibit further copying or printing of the document by workers 4 and 6. However, if worker 6 has a legitimate need to forward that document onto a colleague 10, then this is clearly inconvenient. However, if the document is encrypted but further copying is permitted, then there is nothing stopping worker 6 forwarding the document on to his colleague 10, who may then of course forward the document on to worker 8.

However, each time the encrypted document is transmitted to a new recipient, or a person is to be given access to the document, folder to the like there is an opportunity to encrypt the decryption key using the recipient's public key. This gives an opportunity for a security system to monitor the number of times that the decryption key has been propagated and thereby control the level of propagation of the decryption key, and hence the ability to decrypt the encrypted document. Thus, in general terms, the originator of a document 2 may send the document or give access to recipients 4 and 6 and may also set a propagation control value to, for example, 1 (one), thereby indicating that the decryption key can be propagated one more time. Thus, user 6 has the option to re-encrypt the decryption key using the public key of intended recipients to make one further generation copy of the decryption key. Thus, as the decryption key is encrypted with the public key of user 10, the generation (i.e. copy) control word as embedded in the decryption key sent to user 10 is decremented, such that the generation control key received by user 10 has a value of zero. Thus, although user 10 could still send the encrypted document to worker 8, he will not be able to send the decryption key to worker 8 and thus worker 8 is unable to view the document. Similarly, the user 6 still has the ability to send the key to user 12 as this still only represents a further one generation (copy) step on from user 6. However, the originator 2 may also be able to set a copy limit variable which limits the number of times the user 6 can send the decryption key to a next generation user. Thus, if for example the copy control word was set to one, and the generation control word as received by user 6 was set to one, then user 6 could send a further copy of the decryption key to recipient 10, but in so doing the copy control word stored within the security system belonging to user 6 would be decremented such that the ability of user 6 to send a further copy to user 12, even though this would still represent only one further generation of copying, would be inhibited because user 6 had made their quota of copies.

Thus, the originator of a key has the ability to control both the number of "generations" to which the decryption key may be copied and independently the number of times any key may be copied within a single generation, that is the number of times the user may send a key to others.

Figure 2:
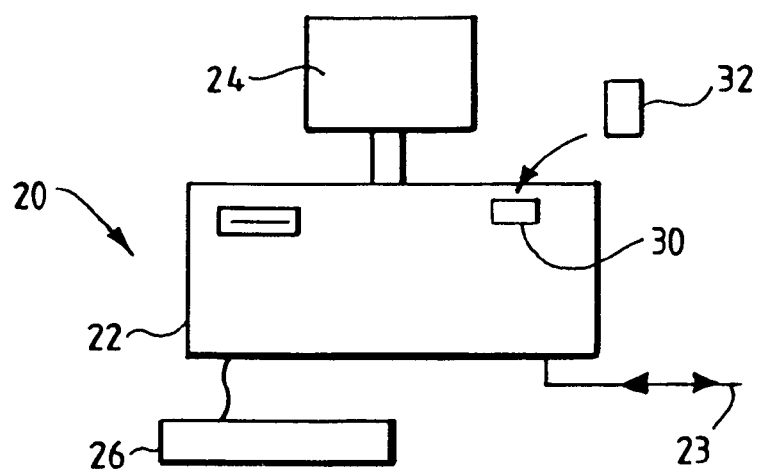
FIG. 2 schematically illustrates a user's computing device as modified to work within a security system constituting an embodiment of the present invention.

FIG. 2 schematically illustrates a computer terminal within a security system constituting one embodiment of the present invention. The computer terminal, generally indicated 20 is in many ways a conventional terminal, such as a standard PC, having a main unit 22 housing a data processor, semiconductor memory, and bulk storage memory, together with various interface cards enabling the computer to communicate with other data processors via a suitable communications network 23 which may be a LAN, a WAN, a dial up connection or any other suitable communication scheme. The data processor also includes a display device 24 and an input device 26, for example a keyboard. A data processor also includes a socket 30 for removably accepting a user security device 32 such that the device 32 can establish data communication with the data processor 20.

Figure 3:
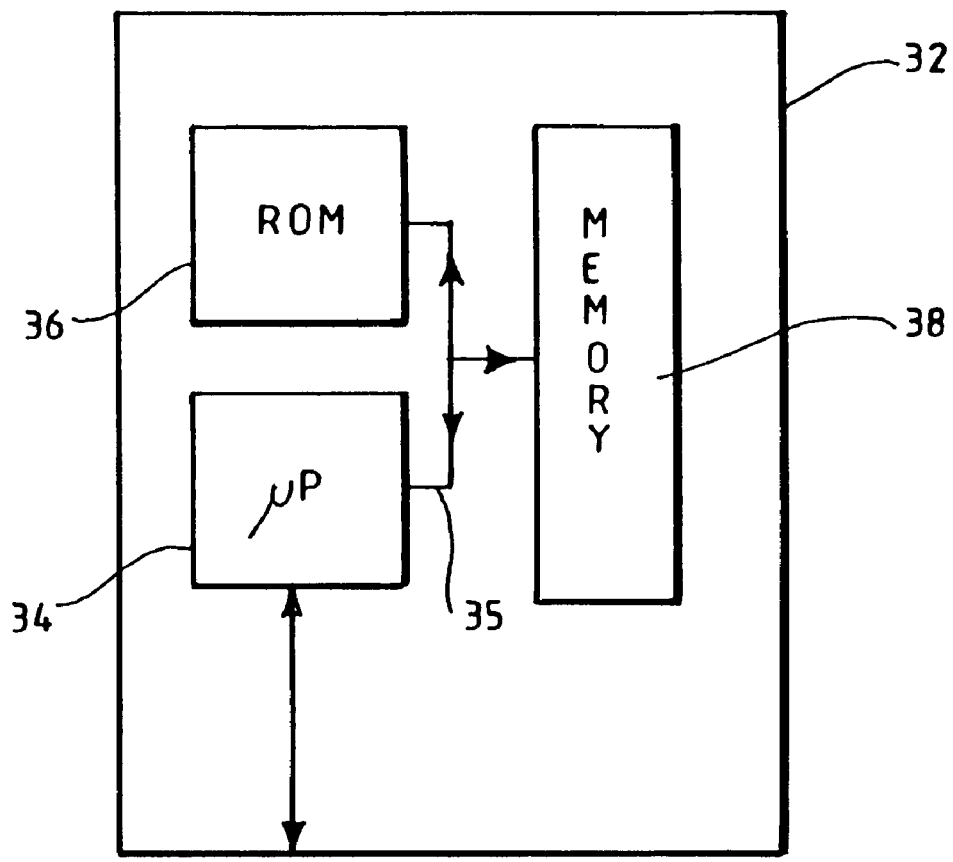
FIG. 3 schematically illustrates the structure of a hardware security device constituting an embodiment of the present invention.

The user's security device 32 is shown in greater detail in FIG. 3. In broad terms, the device comprises an embedded data processor 34 connected via an internal bus 35 to a read only memory 36 containing the executable code for causing the microprocessor 34 to perform encryption and decryption operations and to check the generation and copy control words. The device 32 also includes a non-volatile memory 38 which contains decryption keys and associated identifiers and settings. It should be noted that the internal bus 35 is not directly accessible from outside of the device 32 but all communication is in fact handled via the data-processor 34. This prevents the memory 38 from being interrogated other than by the data-processor 34. Communication between the device 32 and the data processor 30 can be by a bespoke or via standard communications port. Thus, for computers produced around the years 2000 and 2001the communication is likely to be via a USB interface. The interface can, of course, change dependent on the prevailing interface technology.

Figure 4:
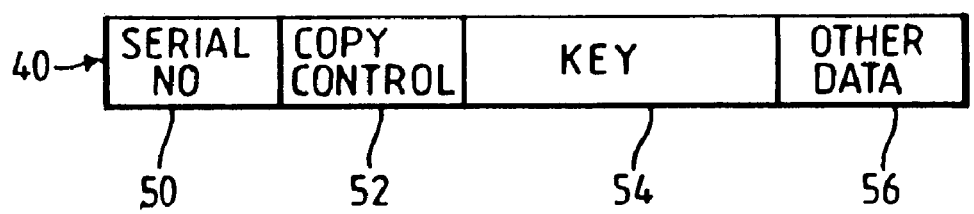
FIG. 4 schematically illustrates the structure of a decryption key associated with a document in a security system constituting an embodiment of the present invention.

FIG. 4 shows the configuration of data within the memory 38 in greater detail. The memory 38 is divided into a series of data units. A single data unit 40 is represented in FIG. 4 and comprises a plurality of elements. A first element 50 is a serial number representing a unique identity of the key. A second portion 52 includes the copy control commands indicating either, or both the number of generations of copies which can be made of the decryption key (i.e. the number of tiers through which it may be copied from user to user), and indeed the number of copies that can be made within a single generation or more. Region 54 contains the decryption key itself and region 56 contains other data, such as the audit trail and any flags or other instructions which may for example concern the need to communicate with persons higher up a data flow path in order to authorize further copying of the decryption key or to inform them that copying of the decryption key has been done.

Figure 5A:
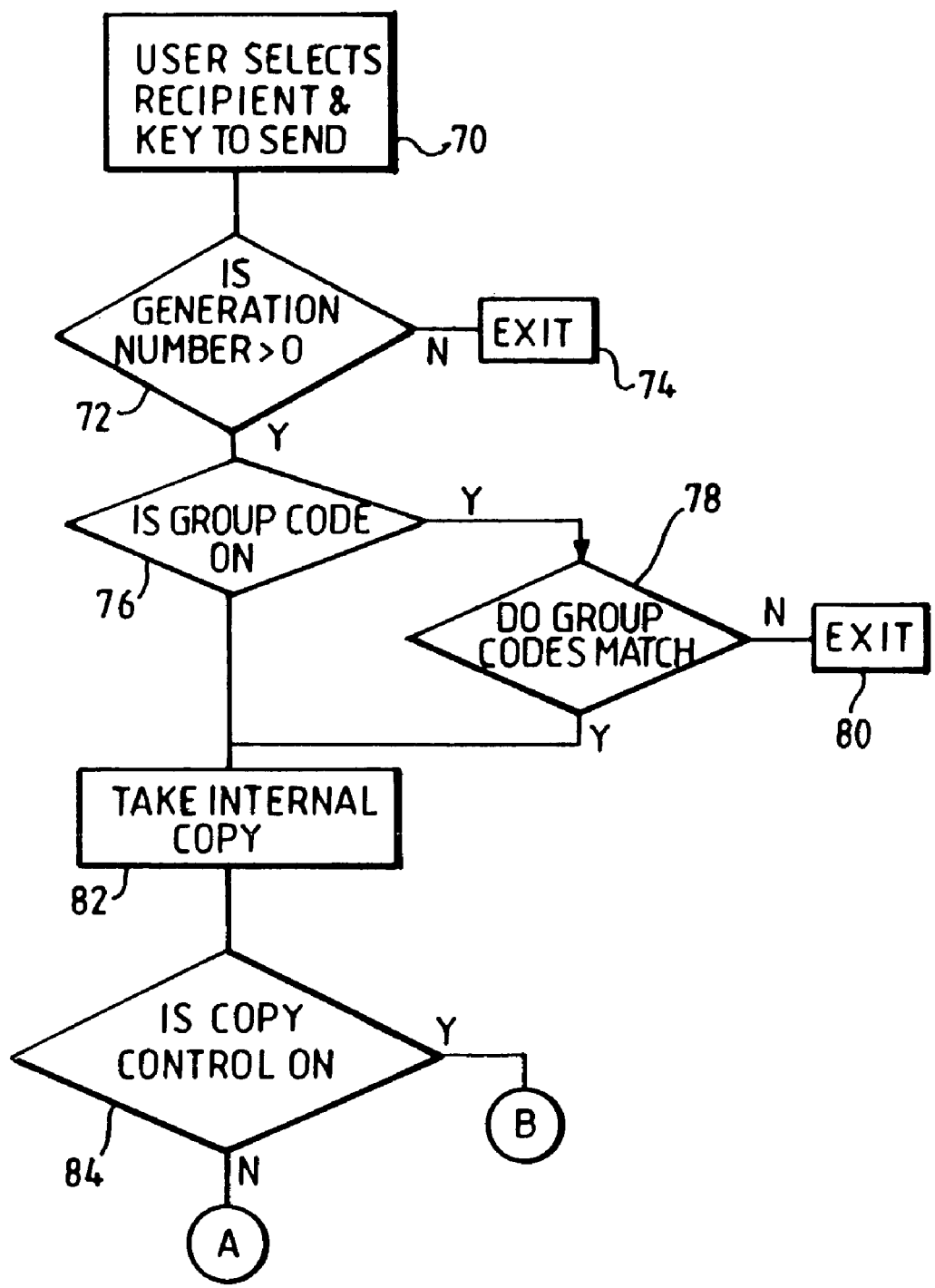
FIGS. 5a and 5b represent a flow chart illustrating the operation of a security system constituting an embodiment of the present invention.
Figure 5B:
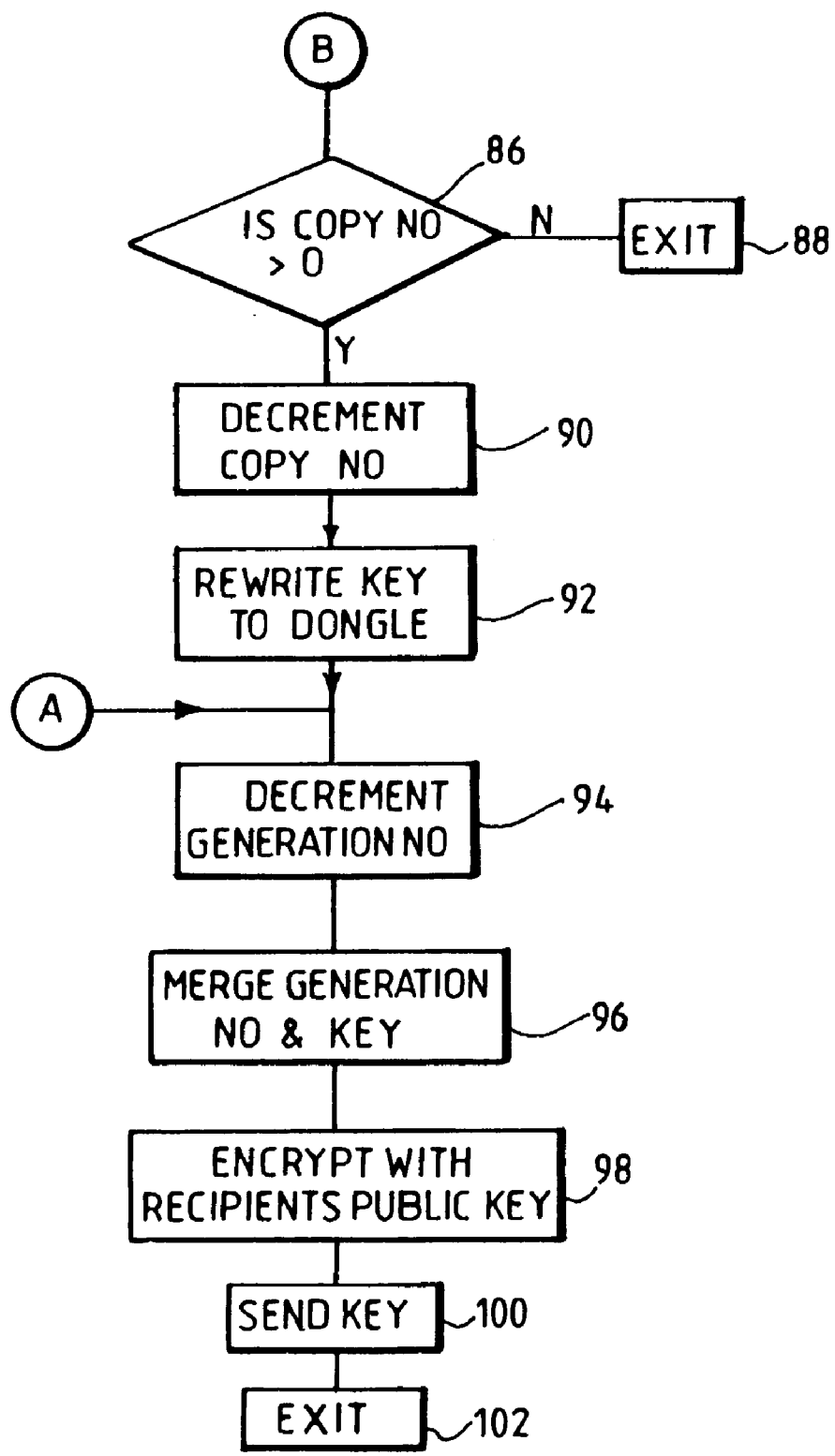

FIGS. 5a and 5b schematically illustrate the operation of one embodiment of the present invention. Initially, control starts at step 70 where it is assumed that a user already has the encryption key, for example the public key, of a recipient that he wishes to send a decryption key to. From step 70, control is passed to step 72 where a test is made to see if the generation number is greater than zero. If the generation number is not greater than zero, then control is passed to step 74 where the procedure is exited. However, if the generation number is greater than zero then control is passed to step 76 where a test is made to see if a "group code flag" has been set. The group code is part of the recipient's public key that indicates which organization they belong to. Thus, the group code can be examined and compared with a pass or deny list in order to determine whether the recipient is entitled to receive the decryption key. If the group code flag is set, control is passed to step 78, whereas if the flag is not set control is passed to step 82.

Step 78 compares the group code embedded in the key which the user wishes to send with the group code of the recipient. If the codes match, or lie within an acceptable range of codes, then control is passed to step 82, otherwise control is passed to step 80 where the procedure is terminated. An internal copy of the key which the user wishes to send is made at step 82 and control is then passed to step 84 where a test to see whether a copy control counter is set. If the copy control counter is set, then control is passed to step 86 whereas, if it is not, control is passed to step 94 as shown in FIG. 5b.

A test is made at step 86 to see if the copy number is greater than zero. If it is not, then control is passed to step 88 where the procedure is exited. However, if the copy control number is greater than zero then control is passed to step 90 where the copy control number is decremented, and then to step 92 where the modified copy of the key including the decremented copy controlled number is rewritten back to the dongle. Control then proceeds to step 94 where the generation number is decremented, and then the modified generation number is merged with the key at step 96. From step 96, control is passed to step 98 where the key and modified generation and/or copy numbers are encrypted with the recipients public key. Control is then passed to step 100 where the key is sent to the recipient. The procedure finishes at step 102.

The above system has been described in terms of allowing access to documents, but could equally apply to access to services, folders, executable files, web pages and so on. Thus one or more documents, some of which may not have yet been generated may be encrypted using the key and shared amongst users.

It would also be possible to use the system to control access to updates to a journal service or the like for a period of time.

Furthermore, although the invention has been described in the context of controlling the propagation of decryption keys, it is equally applicable to controlling the propagation of other security measures such as encryption keys, keys for encryption and decryption, passwords, messages and other electronic "objects" where the ability to propagate that "object" needs to be restricted.

Thus, it is seen that an apparatus and method for providing a security system for controlling the extent of propagation of decryption keys is provided. One skilled in the art will appreciate that the present invention can be practiced by other than the preferred embodiments, which are presented in this description for purposes of illustration and not of limitation, and the present invention is limited only by the claims that follow. It is noted that various equivalents for the particular embodiments discussed in this description may practice the invention as well.

What is claimed is:

1. A security system for controlling access to encrypted information, comprising:
   a hardware device for storing at least one decryption key for use in decrypting an encrypted item of information, the decryption key being associated with a security code which is used by the hardware device to determine whether it is authorized to send encrypted copies of the decryption key to others, wherein if the hardware device is authorized to send an encrypted copy of the decryption key, it encrypts the decryption key and propagates the encrypted copy of the decryption key, wherein each time the hardware device propagates a decryption key, it includes as part of the decryption key an identifier indicating the identity of a sender's key, and wherein a user appends a control word against their identity in the decryption key to instruct the hardware device to initiate a message to them or an agent informing them of the propagation of the key and giving information concerning that propagation.

2. The security system of claim 1, wherein if the hardware device is authorised to send an encrypted copy of the decryption key to a first entity, it encrypts the decryption key using an encryption key associated with the first entity.

3. The security system of claim 2, wherein the decryption key is encrypted with a public key of the first entity.

4. The security system of claim 1, wherein each time the hardware device sends a decryption key to another entity, it modifies the security code associated with the decryption key and sends the modified security code as part of the encrypted decryption key.

5. The security system of claim 4, wherein the security code is a numeric value indicating the number of times the encryption key can be propagated, and the security code is decremented each time the decryption key is propagated to a further entity.

6. The security system of claim 1 wherein the decryption key is stored within the hardware device.

7. The security system of claim 1, wherein the hardware device is removable from a data processor.

8. The security system of claim 1, wherein the hardware device is in the form of a user unit, which, in use, a user introduces to a data processor when the user wishes to use the data processor to access encrypted information and removes the user unit from the data processor when the user has finished.

9. The security system of claim 1, wherein the decryption key includes an audit trail of individuals who have allowed propagation of the key.

10. The security system of claim 1, wherein the decryption key is passed between a plurality of hardware device.

11. The security system of claim 1, wherein a user's private key is stored within their own hardware device, such that the encrypted decryption key can only be decrypted when the hardware device is in operation.

12. The security system of claim 1, wherein the hardware device includes a data processor such that all encryption and decryption of the decryption keys is performed within the hardware device.

13. A method of controlling the propagation of a decryption key that allows access to encrypted data, the method comprising the steps of:
   associating the propagation control word with a decryption key for an item of data, and in response to an instruction to send the key to a specified recipient, checking the status of the control word to determine if propagation is allowed, and if so, modifying the control word and encrypting the control word and decryption key with a recipient's public key and sending the encrypted key, including as part of the decryption key an identifier indicating the identity of a sender's key, and appending a control word against a user's identity in the decryption key to instruct a hardware device to initiate a message to them or an agent informing them of the propagation of the key and giving information concerning that propagation.

14. The method of claim 13, wherein the control word is a numeric value which is decremented at each propagation, and wherein propagation is inhibited once the numeric value reaches a predetermined value.

15. A method of claim 13, wherein an originator of the decryption key sets a maximum number of times the key can be sent, and each time a key is sent, a variable holding a generation number of the key is modified such that when the generation number reaches the maximum number of times the key can be sent, further sending of the key is inhibited.

16. A security system for controlling access to encrypted information by a plurality of users, comprising a hardware device for storing at least one data unit comprising a decryption key and an associated security code, in which the decryption key is used in decrypting an encrypted item of information and the security code controls the number of times that the decryption key can be propagated, and the hardware device examines the security code which code includes a group code as an indication of an acceptable range of recipients to determine whether it is authorized to send encrypted copies of the decryption key to those recipients, wherein if the hardware device is authorized to send an encrypted copy of the decryption key, it encrypts the decryption key and propagates the encrypted copy of the decryption key.

17. A security system of claim 16, wherein if the hardware device is authorised to send an encrypted copy of the decryption key to a first entity, it encrypts the decryption key using an encryption key associated with the first entity.

18. A security system of claim 17, wherein the decryption key is encrypted with a public key of the first entity.

19. A security system of claim 16, wherein each time the hardware device sends a decryption key to another entity, it modifies the security code associated with the decryption key and sends the modified security code as part of the encrypted decryption key.

20. A security system of claim 19, wherein the security code is a numeric value indicating the number of times the encryption key can be propagated, and the security code is decremented each time the decryption key is propagated to a further entity.

21. A security system of claim 16, wherein the decryption key is stored within the hardware device.

22. A security system of claim 16, wherein the hardware device is removable from a data processor.

23. A security system of claim 16, wherein the hardware device is in the form of a user unit, that a user introduces to a data processor when the user wishes to use the data processor to access encrypted information and removes the user unit from the data processor when the user has finished.

24. A security system of claim 16, wherein each time the hardware device propagates a decryption key, it includes as part of the key an identifier indicating the identity of the sender's key.

25. A security system of claim 16, wherein the decryption key includes an audit trail of individuals who have allowed propagation of the key.

26. A security system of claim 16, wherein a user can append a control word against their identity in the decryption key to instruct the hardware device to initiate a message to them or an agent informing them of the propagation of the key and giving information concerning that propagation.

27. A security system of claim 16, wherein the decryption key is passed between a plurality of hardware devices.

28. A security system of claim 16, wherein a user's private key is stored within their own hardware device, such that the encrypted decryption key can only be decrypted when the hardware device is in operation.

29. A security system of claim 16, wherein the hardware device includes a data processor such that all encryption and decryption of the decryption keys is performed within the hardware device.

30. A method of controlling the propagation of decryption keys to a plurality of users for allowing access to encrypted data, comprising the steps of storing at least one data unit on a hardware device, the at least one data unit comprising a decryption key, including a propagation control word with the decryption key in the data unit, and in response to an instruction to send the data unit to a specified recipient, checking the status of the control word to determine if propagation is allowed, including checking that the specified recipient is within an acceptable range of recipients indicated as a group code in the control word, and if so, modifying the control word and encrypting the data unit comprising the control word and decryption key with a recipient's public key and sending the data unit.

31. A method of claim 30, wherein the control word is a numeric value which is decremented at each propagation, and wherein propagation is inhibited once the numeric value reaches a predetermined value.

32. The method of claim 30, wherein an originator of the decryption key sets a maximum number of times the key can be sent, and each time the key is sent, a variable holding a generation number of the key is modified such that when the generation numbers reaches the maximum number of times the key can be sent, further sending of the key is inhibited.

* * * * *